(12) United States Patent
Pryor, Jr. et al.

(10) Patent No.: US 9,272,250 B2
(45) Date of Patent: *Mar. 1, 2016

(54) AUTOMATED MIX IN-CUP APPARATUS AND THE METHOD OF OPERATING THE SAME

(71) Applicant: Hamilton Beach Brands, Inc., Glen Allen, VA (US)

(72) Inventors: Ernest B Pryor, Jr., Maidens, VA (US); Benjamin H Branson, III, Mechanicsville, VA (US); Brian P Williams, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,558

(22) Filed: Jan. 13, 2015

(65) Prior Publication Data

US 2015/0124556 A1    May 7, 2015

Related U.S. Application Data

(60) Continuation of application No. 14/323,272, filed on Jul. 3, 2014, now Pat. No. 8,950,931, which is a division of application No. 12/901,636, filed on Oct. 11, 2010, now Pat. No. 8,807,823.

(51) Int. Cl.
| | |
|---|---|
| *A47J 43/044* | (2006.01) |
| *B01F 7/16* | (2006.01) |
| *B01F 11/00* | (2006.01) |
| *B01F 15/00* | (2006.01) |
| *A47J 43/07* | (2006.01) |
| *A47J 31/60* | (2006.01) |

(52) U.S. Cl.
CPC .............. *B01F 7/161* (2013.01); *A47J 43/044* (2013.01); *A47J 43/0705* (2013.01); *B01F 11/0054* (2013.01); *B01F 15/00032* (2013.01); *B01F 15/00123* (2013.01); *B01F 15/00967* (2013.01); *A47J 31/60* (2013.01)

(58) Field of Classification Search
CPC .............................. B01F 7/161; A47J 43/044
USPC .................................. 366/197, 207; 241/37.5
See application file for complete search history.

(56) References Cited

U.S. PATENT DOCUMENTS

| | | | |
|---|---|---|---|
| 1,592,788 | A | 7/1926 | Supervielle |
| 2,157,683 | A | 5/1939 | Vollrath |
| 2,584,437 | A | 2/1952 | Douglass |
| 2,765,234 | A | 10/1956 | Schmitt et al. |
| 3,505,075 | A | 4/1970 | Black |
| 3,514,080 | A | 5/1970 | Price et al. |

(Continued)

*Primary Examiner* — David Sorkin
(74) *Attorney, Agent, or Firm* — Alexander D. Raring

(57) ABSTRACT

The present disclosure describes an automated blend in-cup apparatus and the related method of operation. The disclosure relates generally to the field of mixing consumable material. More specifically, the disclosure relates to a mixer that is automatically operable to lower a mixing blade into a cup or vessel that contains material to be blended/mixed. A shield is automatically lowered to at least partially isolate the cup. The apparatus further comprises a well with an inlet manifold and a drain and a fixed but removable cup-receiving holder. The shield can include a magnetic portion that is detected by a first sensor on the apparatus. A safety interlock prevents the actuation of the mixing blade in the event that the magnetic portion is not proximate to the first sensor. Overall, the apparatus is effective, fast, easy to operate, safe, and clean.

8 Claims, 17 Drawing Sheets

(56) References Cited

U.S. PATENT DOCUMENTS

| | | | |
|---|---|---|---|
| 4,096,893 A | 6/1978 | Harvey, Jr. et al. |
| 4,528,824 A | 7/1985 | Herbert |
| 4,548,054 A | 10/1985 | Levine |
| 4,637,221 A | 1/1987 | Levine |
| 4,681,030 A | 7/1987 | Herbert |
| 4,693,611 A | 9/1987 | Verkler |
| 4,708,489 A | 11/1987 | Carlson |
| 4,740,088 A | 4/1988 | Kelly, Jr. |
| 4,822,175 A | 4/1989 | Barnard et al. |
| 5,067,819 A | 11/1991 | Heinhold et al. |
| 5,150,967 A | 9/1992 | Neilson et al. |
| 5,208,050 A | 5/1993 | Ney |
| 5,328,263 A | 7/1994 | Neilson |
| 5,439,289 A | 8/1995 | Neilson |
| 5,580,007 A | 12/1996 | Caviezel et al. |
| 5,803,377 A | 9/1998 | Farrell |
| 5,960,701 A | 10/1999 | Reese et al. |
| 5,962,060 A | 10/1999 | Farrell |
| 6,041,961 A | 3/2000 | Farrell |
| 6,318,889 B1 | 11/2001 | Hansen, Sr. |
| 6,341,887 B1 | 1/2002 | Hansen, Sr. |
| 6,465,034 B2 | 10/2002 | Farrell |
| 6,474,862 B2 | 11/2002 | Farrell |
| 6,689,410 B2 | 2/2004 | Gerber |
| 6,772,675 B2 | 8/2004 | Ervin |
| 6,945,157 B2 | 9/2005 | Brown et al. |
| 7,048,217 B2 | 5/2006 | Dickson, Jr. et al. |
| 7,104,474 B2 | 9/2006 | Katz et al. |
| 7,144,150 B2 | 12/2006 | Farrell |
| 7,207,506 B1 | 4/2007 | Dickson, Jr. et al. |
| 7,520,658 B2 | 4/2009 | Farrell |
| 7,520,662 B2 | 4/2009 | Farrell |
| 8,807,823 B2 | 8/2014 | Williams et al. |
| 2005/0183426 A1 | 8/2005 | Learned |
| 2007/0193299 A1 | 8/2007 | Landers et al. |
| 2008/0279040 A1 | 11/2008 | Neilson |

AUTOMATED MIX IN-CUP APPARATUS AND THE METHOD OF OPERATING THE SAME

FIELD OF THE DISCLOSURE

The present disclosure is directed to an automated mix in-cup apparatus and the related method of operation. The disclosure relates generally to the field of mixing consumable material. The apparatus is effective, fast, easy to operate, safe, and clean.

BACKGROUND OF THE DISCLOSURE

In a commercial food environment, it is often important to prepare items as quickly as possible. This objective runs counter to the mandate that all food preparation devices remain as sanitary as possible. That is, in the rush to deliver an item to a customer, it is possible that best practices regarding sanitation are not observed. It is also understood that human error increases as a person more quickly repeats a repetitive task. In other words, the person preparing the food or drink may "get sloppy" as the food or drink preparation is accelerated.

A conventional blender requires that the food/drink components are separately loaded into a blender jar. The jar is closed and placed on a blender base. The machine is activated to blend the contents, which are then placed into another receptacle. The blender and/or blender base is cleaned between consecutive blending operations.

Other commercial food preparation and drink delivery units include drink and ice dispensers and mixers for frozen drinks or confections. Drink and ice dispensers can be manually operated by a customer, as found in many 'fast food' establishments, or they can include the automated filling of various cup sizes.

Commercial mixers for frozen drinks or confections typically involve a user (i.e., employee) loading a metal cup with the beverage ingredients onto a machine. The cup is positioned so that a mixing blade is located in the cup. The user then activates the machine in order to spin the blade. In this conventional machine, it is possible to remove the cup while the mixing blade is still spinning, which results in the beverage/confection splashing onto the machine and/or user. To achieve a more even mix, a user may also manually move the cup up-and-down during the mix cycle. However, this practice increases the chances that the beverage or confection will splash out of the cup. Basically, the operation becomes less sanitary and less safe as the operator attempts to more quickly complete the task. The mixed material must be transferred to another receptacle.

Machines for automatically accomplishing the mixing operation have also been envisioned. For the automated units, there is still the question of cleaning the blade and apparatus used in the mixing operation. It is important that a flavor from one mix cycle does not contaminate the next mix cycle, which might be for a different flavor. In addition, the drink or confection must be cleaned from the machine regularly to avoid build up and contamination on the machine. It is thought that the operation of known automated machines is relatively slow and complex.

There remains a need for an apparatus for mixing consumable material in-cup, and a method of operating the same, that is fast, effective, safe, clean, and easy to operate. An automated mix in-cup apparatus and the method of operating the same as disclosed below addresses at least one of these or other needs.

SUMMARY OF THE DISCLOSURE

The present disclosure is directed to an automated mix in-cup apparatus adapted to mix consumable material. An 'in-cup mixer', 'mix in-cup' or 'blend in-cup' apparatus is understood to be a mixer where the consumable contents are not transferred to another vessel after the mix cycle and prior to consumption. Conventional mixers and blenders use dedicated mixing vessels and then all or part of the mixed material is transferred to a serving vessel (glass, Styrofoam cup, etc.).

Among other advantages, the automated mix in-cup apparatus disclosed herein is thought to be fast, clean, easy to operate, safe, and effective. The automated mix in-cup apparatus for mixing consumable material includes a frame supporting a stepper motor to move a carriage up and down on the frame. The carriage supports a mixing motor, a shield prop, and a combined splash shield and lid. The frame comprises a vertically aligned stand and a horizontal, cup-supporting leg. An optional cup-receiving holder is positioned on the leg of the frame.

In one embodiment, movement of the carriage is accomplished via the stepper motor and a lead screw. The lead screw passes though the carriage, and the carriage is supported on the lead screw via a nut. The stepper motor rotates the lead screw, also known as a translation screw, to translate the radial motion imparted by the stepper motor into a linear movement for the carriage. Rotation of the lead screw either raises or lowers the carriage on the frame. One or more guide rails pass through the carriage to keep the carriage aligned on the frame.

The mixing motor is attached to the carriage, and a rotatable mixing blade extends downwardly from the mixing motor. The mixing motor moves along with the carriage. The mixing blade is reciprocally moveable along with the mixing motor and carriage. When engaged, the mixing motor is operable to rotate the mixing blade in order to mix the consumable contents of the cup.

The horizontal portion of the frame may comprise a flat floor to support a cup or a cup-receiving holder. The floor may include liquid nozzles (small diameter apertures) from a manifold to eject a fluid upwardly from the floor. A drain aperture might also be employed in the floor as a liquid outlet. The drain is preferably proximate the cup-receiving position.

In another embodiment, the horizontal portion of the frame further comprises a liquid well comprising a recessed floor and a sidewall. The well could further include a liquid inlet manifold having at least one nozzle fluidly connecting the manifold and well. The well might further include a drain to serve as at least one liquid outlet for the well. In this embodiment, the optional cup-receiving holder is positioned above the floor of the well. The cup is positioned in the well or on the cup-receiving holder above the floor of the well. The cup-receiving holder may be selectively removed from the apparatus for cleaning.

The splash shield includes at least one sidewall, a closed lid or top, and a lower opening. The lid and shield might be integral parts or the shield might be secured to the lid via known fasteners. The splash shield and lid surround the mixing blade. The blade is connected to the mixing motor via a shaft that extends through an aperture in the shield's top end. A seal can be employed about the shaft in the lid aperture to prevent a fluid escaping upwardly from the shield. The seal is in close proximity to the shaft and may contain an internal helix groove. The helical groove on the inside surface of the seal directs any liquid between the shaft and seal downwardly.

The subject splash shield, mixing blade, and mixing motor are all reciprocally movable along a shared axis via the movement of the carriage on the lead screw. However, the splash shield can be moved independently of the mixing blade and motor via the shield prop, as described below.

Once engaged, the apparatus automatically moves the mixing blade, mixing motor, and splash shield from a home position to a mixing position. In the mixing position, the mixing blade is located within the dimensions of the cup. The shield rests on the cup, and the lid of the shield closes the cup. During a mix cycle, the blade can move up and down through the consumable material without displacing the shield.

The mixing motor, mixing blade, and splash shield return to the home position. The user removes the cup, and the apparatus moves the carriage to a cleaning position whereby the shield comes into contact with the frame, such as at the well floor, to selectively encase the cup-receiving position and optional cup-receiving holder on the frame. The blade can be positioned so as to pass through the cup-receiving holder during a cleaning cycle.

In one embodiment, a pulley system acts as a cord a cord management system for a power cord connected to the mixing motor. The power cord, which might also enclose sensor wires, is fixedly secured to the carriage at a first end and is fixedly secured to the frame at a second end. The carriage moves up and down on the frame. As a cord management system, the pulley system includes one stationary and one moveable, spring-biased pulley to manage slack in the power cord as the carriage moves up and down. As the carriage moves down on the frame, the moveable pulley is lifted by the tension placed on the power cord. As the carriage moves up on the frame, a spring biases the moveable pulley down to take up slack in the power cord.

In use, the machine starts at a first home or open position. A user places a cup with consumable material on the cup-receiving holder and activates the apparatus. The stepper motor rotates the lead screw in order to lower the carriage. The downward movement of the carriage lowers the mixing motor, mixing blade, and splash shield to a mixing position. As a result, the shield is lowered around the cup until the lid contacts and closes the open top of the cup. Similarly, the mixing blade enters the interior space of the cup.

In this mixing position, the shield at least partially isolates the cup from the user. The lid also prevents the material in the cup from exiting the cup during a mix cycle. Once the apparatus is in the mixing position, the motor is activated to rotate the mixing blade thereby causing the consumable material to be mixed. The speed of the blade may be variable, and a speed sensor can be included so as to output motor speed feedback to a control board. In addition, the blade may move up and down within the cup during the mix cycle without displacing the splash shield.

After the mix cycle is completed, the shield and blade automatically retract to an open or home position so as to allow access to the cup. The cup is then removed. A cleaning cycle is then manually or automatically activated. The carriage is again lowered. In the cleaning position, the shield comes into contact with the frame to create a sealed, enclosed space. For the cleaning cycle, the blade can be positioned at various distances from the floor of the frame/well, including beneath the level of the cup-receiving holder.

Fluid is injected into the interior of the shield via the inlet manifold so as to contact the shield and blade during the cleaning cycle. The fluid is used to rinse the shield and blade. The blade may rotate during the cleaning cycle to increase fluid distribution or force. The rinse fluid is removed via the drain. In this manner, the automated mixing of the material and subsequent cleaning of the apparatus can be achieved. The cleaning cycle is fast and effective. The blade is isolated from the user during the mixing and cleaning operations. The cleaning operation is thought to remove all food or drink material and to prevent any flavor contamination between mix cycles.

In at least one embodiment, it is also envisioned that a number of sensors could be employed. The sensors are used to electronically determine the position of the motor, blade, and/or shield and to act as interlock mechanisms to disengage the mixing motor if a user displaces the shield during the mixing or cleaning cycles. In other words, the feedback from the sensors is used to automatically prevent the rotation of the blade unless the splash shield is properly positioned. In one embodiment, the failure to remove a cup from the cup-receiving position prior to initiating the cleaning cycle would also prevent the movement of the mixing blade to the blade's cleaning position. The blade or blade shaft would contact the cup. In response, the unit would return the shield to the home position.

Further features and advantages of the present disclosure will become apparent to those of skill in the art from the following detailed description of a preferred embodiment taken in conjunction with the accompanying drawings.

BRIEF DESCRIPTION OF THE DRAWINGS

The features and objects of the subject mix in-cup apparatus and related method will be better understood from the following detailed description taken in conjunction with the drawings wherein.

DETAILED DESCRIPTION

The present disclosure is directed to an automated mix in-cup apparatus and the method of using the same. In general, the automated mix in-cup apparatus is thought to be more effective, safer, faster, cleaner and easier to operate than known devices. The apparatus and method are described and illustrated in terms of various embodiments. Of course, the present disclosure is not limited to the embodiments disclosed herein but also includes variations and equivalent structures that would be apparent to one of skill in the art, having studied the subject disclosure.

Figure 1:
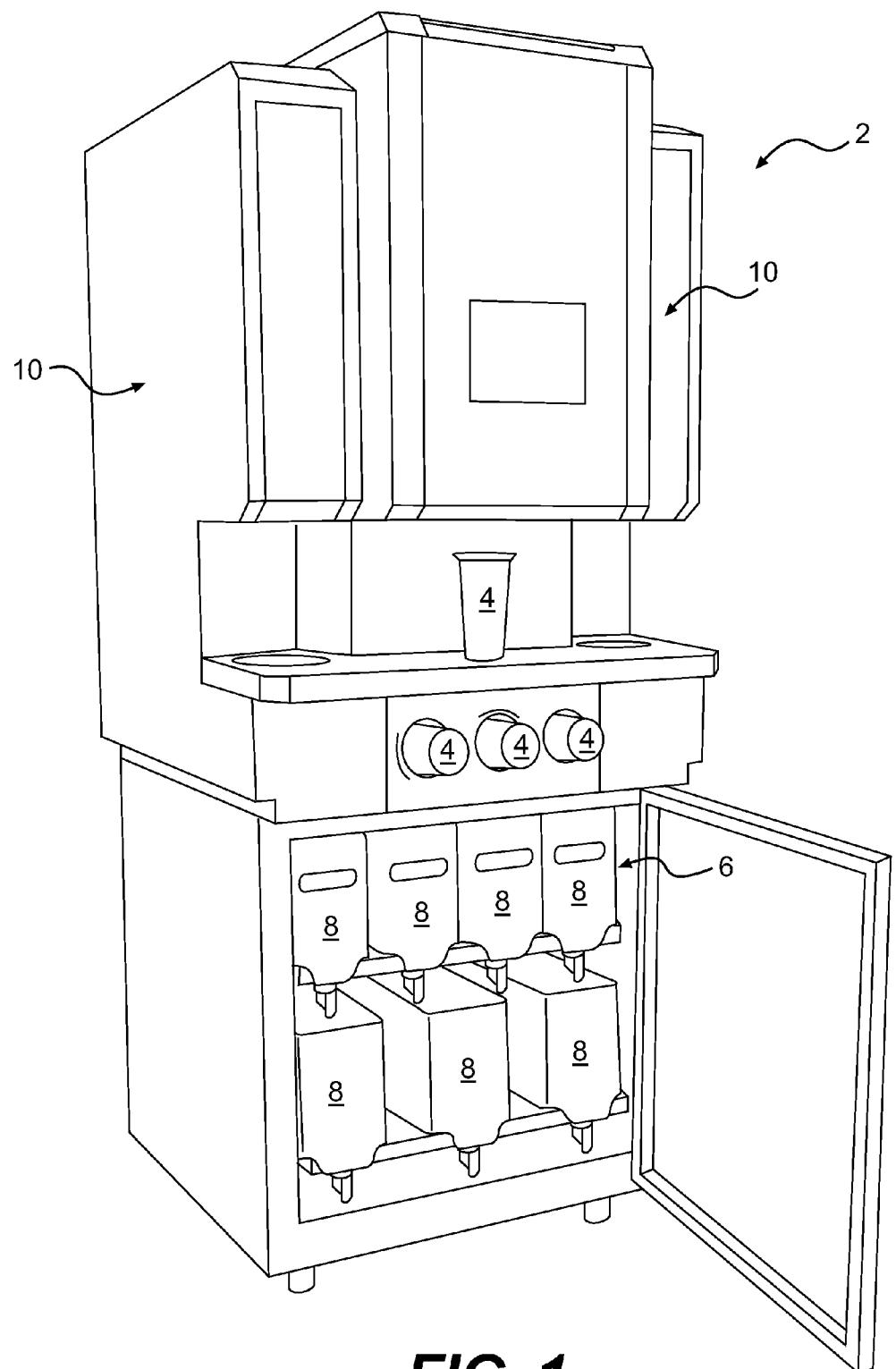
FIG. 1 is a perspective view of the housing for a combined fluid or ice dispensing and mixing unit wherein the mixing apparatus is envisioned as the apparatus disclosed herein.

Turning now to the drawings, FIG. 1 illustrates a combined commercial fluid/ice dispensing and mixing unit 2. Unit 2 comprises an outer housing to cover both the dispensing and mixing machinery. Unit 2 may also include a cabinet 6 accommodating a plurality of fluid containers 8 fluidly connected to a dispenser. An ice or frozen slurry dispenser and/or hopper may also be included in the unit.

The overall operation of unit 2 comprises a user selecting the cup 4, which may be selected from a single size or a plurality of differently sized cups, and placing cup 4 on unit 2 proximate to a dispensing mechanism (not illustrated or described further herein). The dispensing mechanism is actuated to at least partially fill cup 4 from fluid containers 8 and/or a frozen fluid dispenser. The fluid containers 8 could contain various flavors of consumable drink mix. The cup would also at least partially be filled with ice or other frozen consumable material from unit 2.

One or more automated mix in-cup apparatuses 10 are located next to the dispensing apparatus for mixing/blending drinks such as smoothies, milkshakes, ice coffee drinks, or the like. After the step of dispensing a fluid into the cup, the user positions cup 4 containing the selected flavor and frozen material at a cup-receiving position on mix in-cup apparatus 10. Mix in-cup apparatus 10 is then engaged to commence an automated mixing operation of the cup contents, as explained further below. The user does not contact the apparatus 10 other than to select mix cycles or otherwise actuate the switches or buttons necessary to begin the operation of the unit.

With respect to FIGS. 2-14, there is illustrated one or more embodiments of the mix in-cup apparatus and the method of operation of the same as described herein. The apparatus moves between three operational positions, as detailed further below with specific reference to the figures and labeled elements.

In general, the first position is the open or "home" position where a mixing blade, a mixing motor, and a splash shield are elevated above a cup-receiving position so as to allow a user access to the cup-receiving position. In the mixing position, the splash shield is lowered until it engages and closes cup 4. The shield is held on the cup by gravity. While the shield always surrounds the sides and top of the mixing blade, the shield also surrounds the sides of cup 4 and closes the top of cup 4 in the mixing position. The mixing blade is positioned inside cup 4 when the apparatus is in the mixing position. During a mix cycle, the blade may move up and down within the cup independent of the movement of the splash shield.

In a cleaning position, the cup is first removed from the cup-receiving position, and the shield is again lowered until it contacts a floor. The floor and shield act to create a sealed interior space. In the cleaning position, the blade is moved into a position that may be below the cup-receiving position. A user cannot access the mixing blade in the cleaning or mixing positions without manually displacing the shield.

Figure 2:
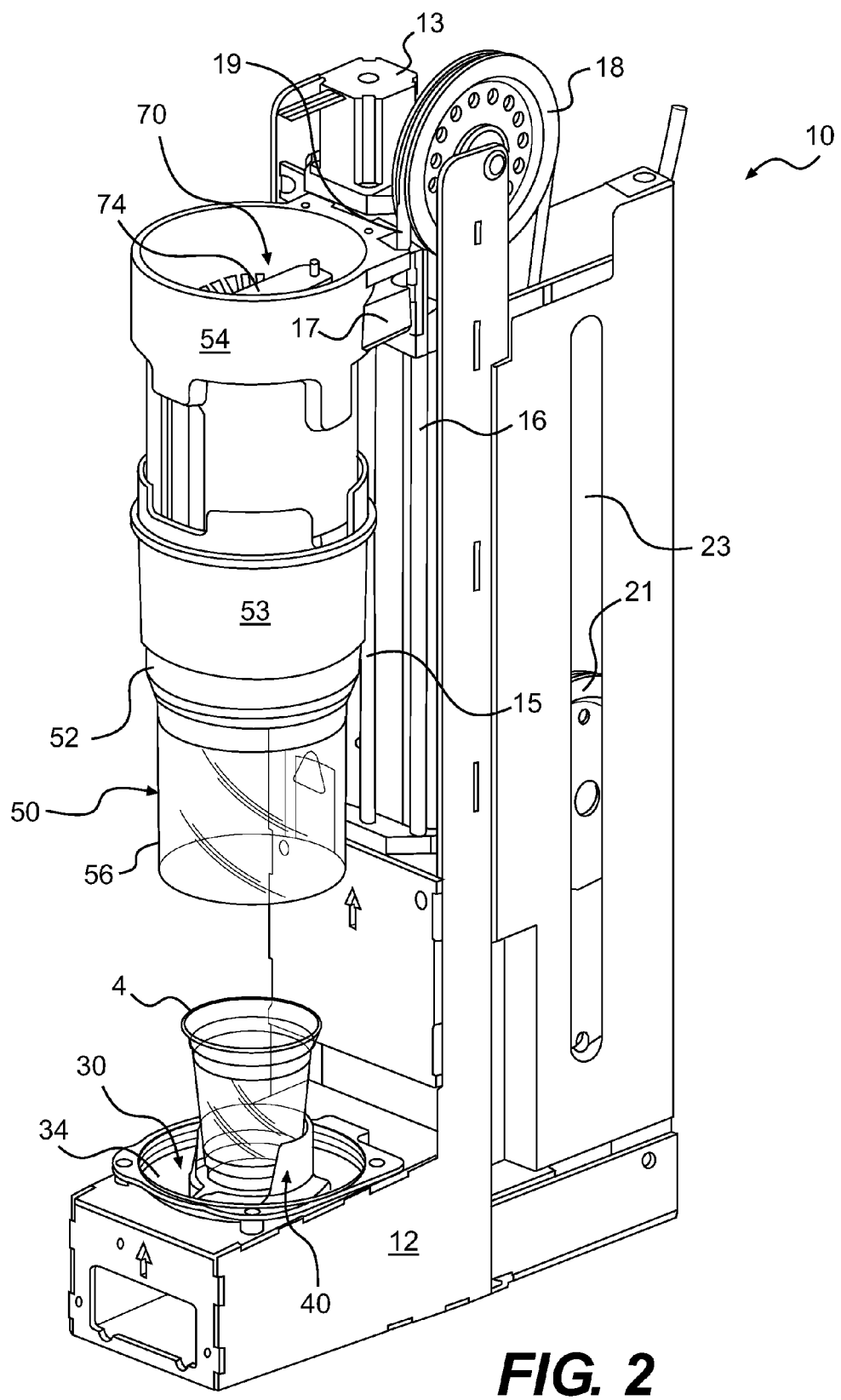
FIG. 2 is a perspective view of the automated mix in-cup apparatus as disclosed herein wherein a mixing blade and a splash shield are shown in an elevated or home position.
Figure 3:
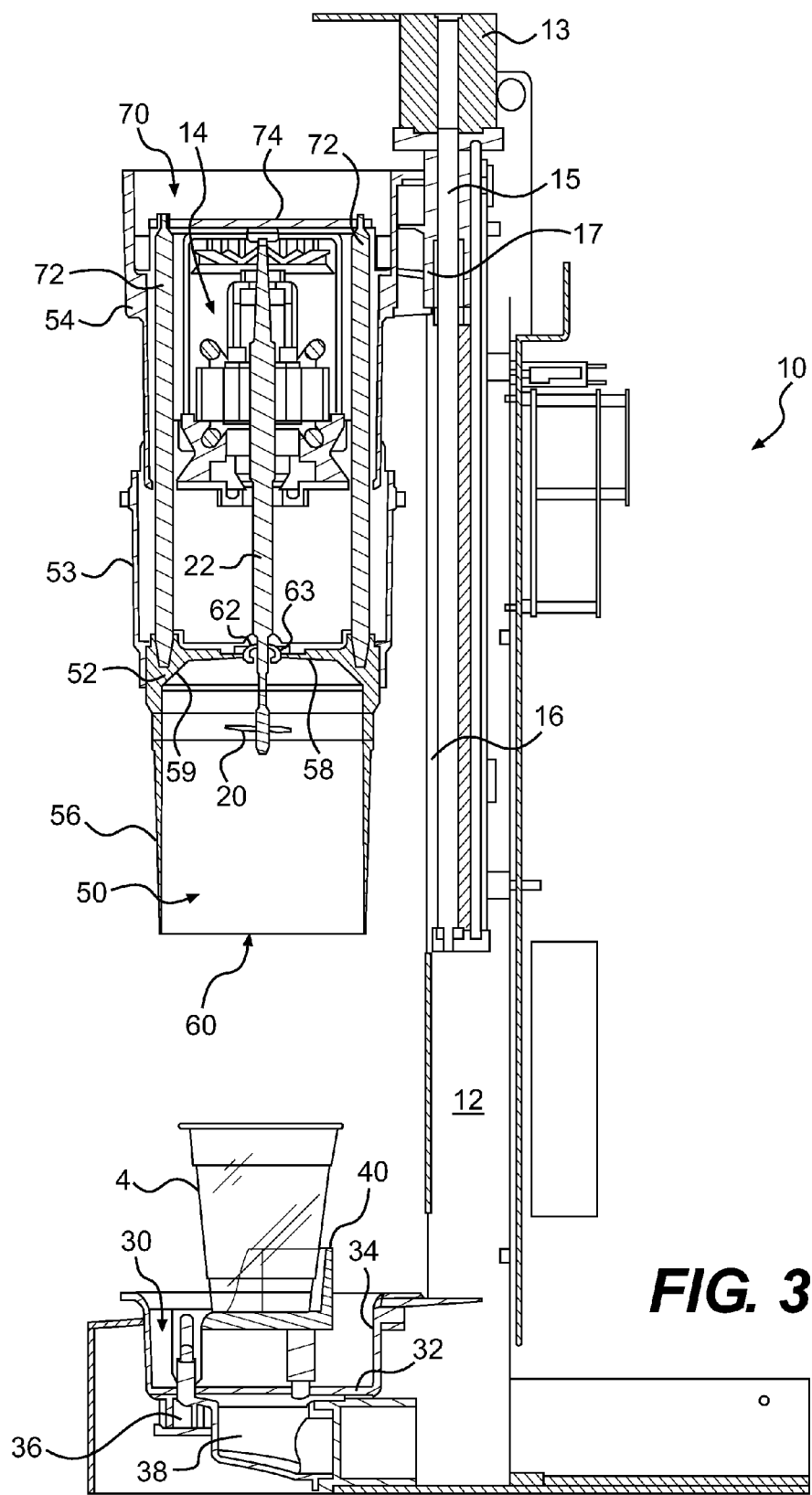
FIG. 3 is a side cut-away view of the same wherein a well, a cup-receiving holder, and a drain are further illustrated.

Turning to FIGS. 2 and 3 in further detail and with specific reference to the labeled elements, there is illustrated a mix in-cup apparatus 10 in accordance with at least one embodiment of this disclosure. The automated mix in-cup apparatus 10 for mixing consumable material includes a frame 12 supporting a stepper motor 13. Frame 12 in this embodiment is generally an L-shaped, substantially vertical structure with sufficient width to support mechanical components as described below. Frame 12 could in turn be mounted to the structure of the combined unit 2 and be largely enclosed behind a housing. It is also envisioned that mix in-cup apparatus 10 might instead serve as a standalone device for mixing consumable material in cup 4.

FIGS. 2 and 3 illustrate the home position of apparatus 10. As illustrated, the horizontal portion of the L-shaped frame 12 supports cup 4 at a cup-receiving position. The stand portion of frame 12 supports a vertically aligned lead screw 15 connected to stepper motor 13. Stepper motor 13 is positioned at the top of frame 12. The distal end of lead screw 15 is mounted in a bearing (not illustrated).

One or more guide rails 16 are vertically aligned on frame 12 and are parallel to lead screw 15. Lead screw 15 and guide rails 16 pass through a carriage 17. A nut (not illustrated) under carriage 17 on lead screw 15 retains carriage 17 in place on lead screw 15. As stepper motor 13 rotates lead screw 15, the nut moves up and down on the screw. As a result, carriage 17 moves up and down relative to frame 12. Guide rails 16 further support carriage 17 and maintain the alignment of carriage 17 as it moves. Overall, activating stepper motor 13 rotates lead screw 15, and lead screw 15 translates the rotational movement into the linear up-and-down movement of carriage 17.

In one embodiment, as explained further below, a pulley system acts as a cord management system for a power cord 19 connected to carriage 17. Power cord 19, which might also enclose sensor wires, is fixedly secured to carriage 17 at a first end and is fixedly secured to frame 12 at a second end. To account for the movement of carriage 17, the pulley system includes one stationary pulley 18 and one moveable, spring-biased pulley 21.

Moveable pulley 21 is at least partially placed within a pulley housing that slides within a vertical track defined by frame 12. Moveable pulley 21 includes an axle mounted to the sliding housing. A spring 23 is secured to the housing a proximate end. Distal end of spring 23 is attached to a point on frame 12 beneath the pulley housing so as to maintain a tension force on the pulley housing. As carriage 17 moves down on lead screw 15, moveable pulley 21 is lifted by the tension placed on power cord 19. That is, the downward force on carriage 17 overcomes the tension force of spring 23. As carriage 17 is lifted on lead screw 15 so as to move up relative to frame 12, spring 23 biases moveable the pulley housing downwards so that pulley 21 move down within the frame's track. In this manner, any slack in cord 19 is controlled by the pulley system.

Carriage 17 supports a mixing motor 14, a shield prop 70, and a splash shield 50. Any suitable type of electric motor may be employed as mixing motor 14, as would be known or used in the mixing art. A mixing motor housing 54 surrounds and supports mixing motor 14 and housing 54, in turn, is secured to carriage 17. In this manner, carriage 17 supports motor 14. Mixing motor 14 is axially aligned above cup 4 when cup 4 is in the cup-receiving position. The horizontal portion of the frame defines a floor to support cup 4 or an optional cup-receiving holder 40 may be positioned on frame 12 at the cup-receiving position. In an embodiment where frame 12 defines a fluid-receiving well, holder 40 is at least partially placed in the well. With the holder, a cup never contacts a drain or floor of the apparatus, which is thought to be more sanitary.

A rotatable mixing blade 20 extends vertically downwardly from mixing motor 14 via a shaft 22. Blade 20 is used for mixing a consumable material in cup 4. Motor 14 is operable to rotate mixing blade 20 and shaft 22. Blade 20 moves relative to frame 12 when mixing motor 14 is raised or lowered via carriage 17. Shaft 22 extends from mixing motor 14 at a fixed length. As such, blade 20 is reciprocally moveable along a shared axis with mixing motor 14.

In one embodiment, frame 12 further comprises a liquid well 30 sharing a vertical axis with cup 4, mixing motor 14, shaft 22, and splash shield 50. Well 30 is a recess in the horizontal portion of the L-shaped frame 12 including a floor 32 and a sidewall 34. In this embodiment, floor 32 is considered to be a part of frame 12. Well 30 may be a plastic molded part inserted into frame 12.

Figure 10:
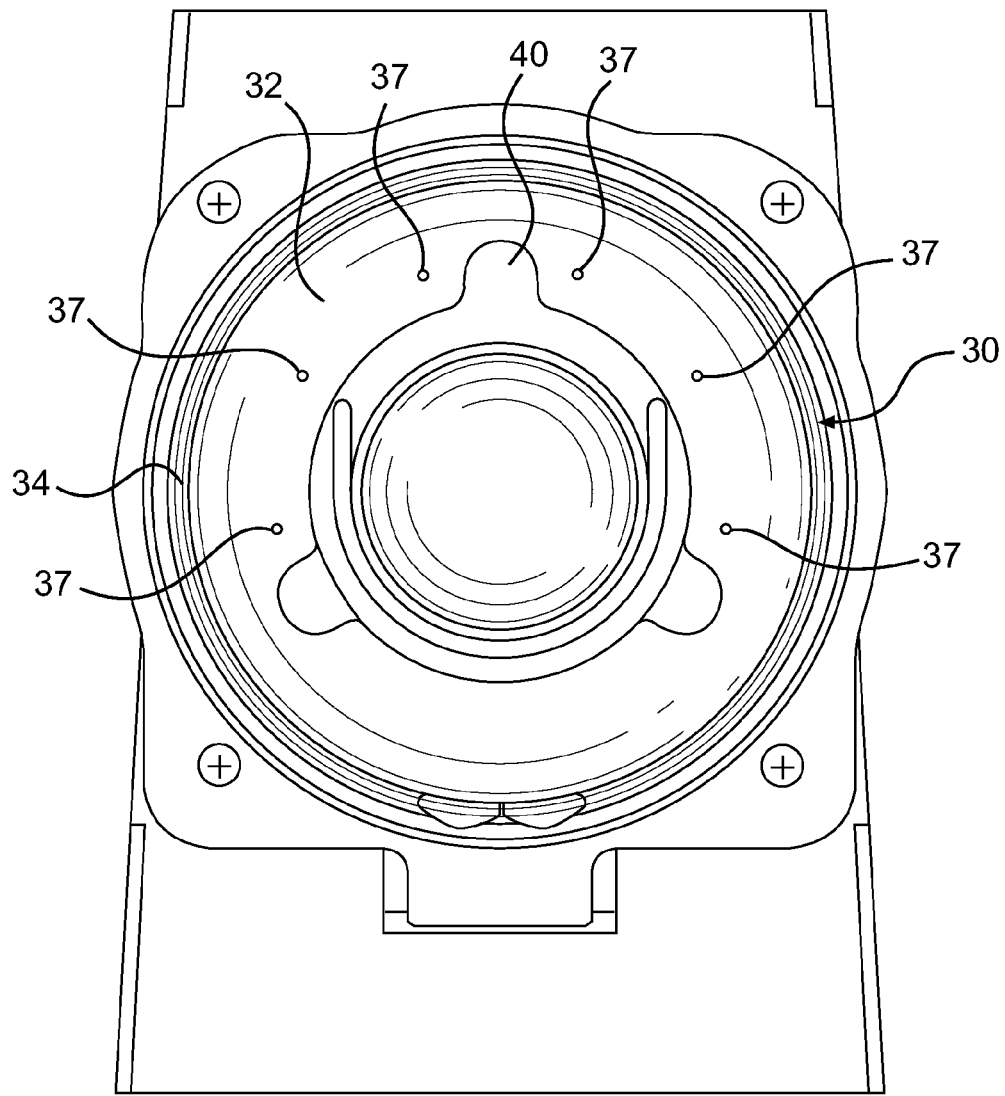
FIG. 10 is a top-down view of the well and the cup-receiving holder as disclosed herein in at least one embodiment.
Figure 11:
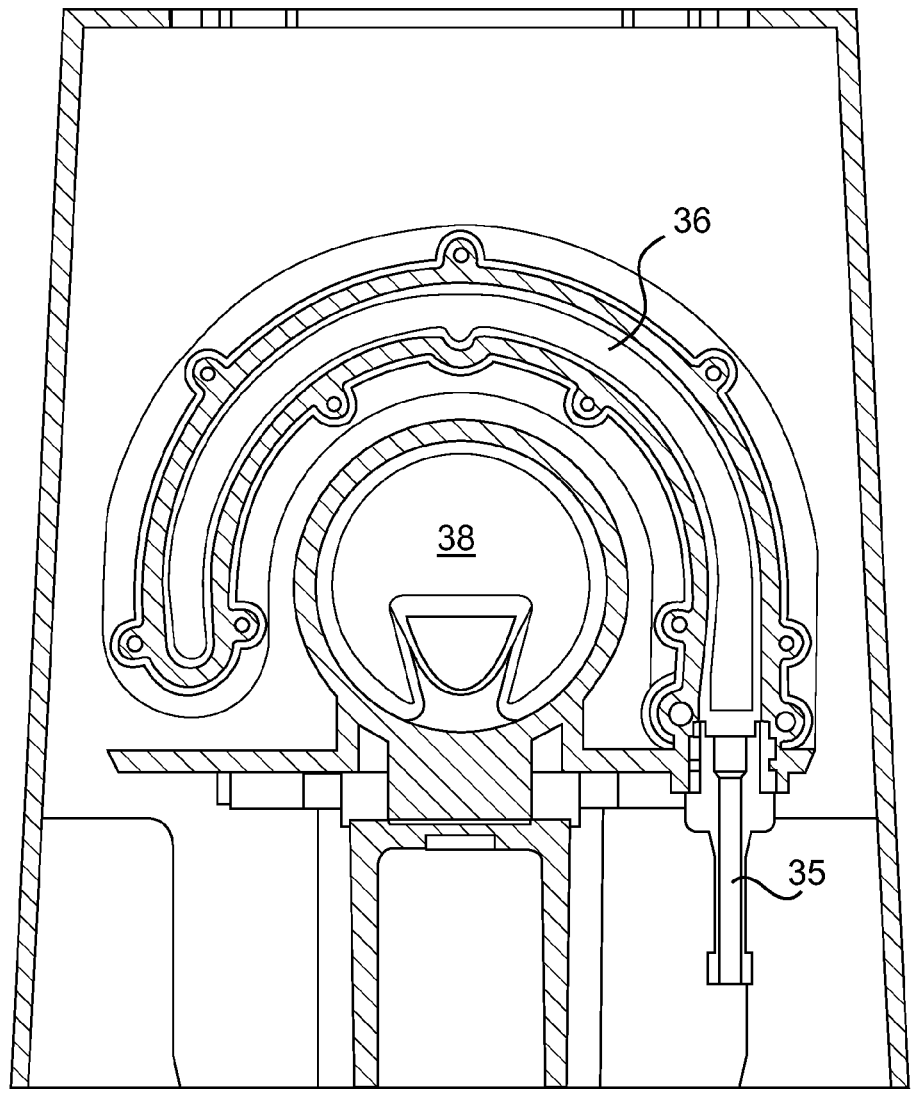
FIG. 11 is a top-down cut-away view of the a water inlet manifold and the drain as disclosed herein.

A liquid inlet manifold 36 is integral to or connected to frame 12, and manifold 36 includes at least one nozzle fluidly connecting the manifold to the exterior of frame 12 (see also FIGS. 10 and 11). In the illustrated embodiments where an optional recessed well 30 is employed, manifold 36 is integral to or connected to well 30. A cleaning liquid, which might be water or a combination of water and a known cleaning agent, is selectively ejected from manifold 36. A drain 38 acts as at least one liquid outlet. In the embodiment containing the well, drain 38 is integral to or connected to well 30. In either embodiment, a drainpipe would connect to the drain so that the cleaning fluid is removed from apparatus 10.

The optional cup-receiving holder 40 is positioned to support a cup above frame 12, such as above floor 32 of well 30. Holder 40 may be selectively removable from the apparatus for cleaning, as further described below (see also FIG. 14).

Splash shield 50 may consist of an opaque, semi-transparent or transparent material. In the cup-receiving position, such as when cup 4 is placed on holder 40, cup 4 is axially aligned beneath shield 50.

Shield 50 comprises a shield lid 52 and a cylindrical sidewall 56 depending from lid 52. Shield 50 defines an open bottom end 60 into which cup 4 and/or cup-receiving holder 40 can be placed. Shield 50 is suspended from motor housing 54 by a shield prop 70. Prop 70 includes two guide rods 72 and upper stop plate 74. In a home position, stop plate 74 rests atop mixing motor 14 or mixing motor housing 54 with guide rods 72 securely fixed to shield lid 52.

As carriage 17 moves to a mixing position, shield lid 52 engages the open top of cup 4 so as to close the lid. Shield sidewall 56 at least partially surrounds cup 4 at the cup-receiving position. In the mixing position, the downward movement of shield 50 is limited by the height of cup 4, and shield 50 rests atop cup 4. However, carriage 17 may continue to move downward along lead screw 15 after shield 50 engages cup 4. The continued downward motion of carriage 17 causes motor housing 54 to move along shield god rods 72. The upper stop plate separates from mixing motor 14 and motor housing 54. Carriage 17 can continue downwards until motor housing 53 engages the top of lid 52.

Moving carriage 17 upwards will not displace shield 50 until mixing motor 14 and/or motor housing 54 engage upper stop plate 74. Once engaged, the continued upward movement of carriage 17 lifts stop plate 74. Guide rods 72, which are fixed at a first end to plate 74 and at a second end to shield 50, then lift shield 50. For aesthetic purposes, an outer housing 53 can selectively nest over motor housing 54. Outer housing 53 is supported atop lid 52. As motor housing 54 moves away from shield 50, outer housing 53 encases guide rods 72 and shaft 22 between motor housing 54 and lid 52. As the motor housing 54 is brought into closer proximity to lid 52, outer housing 53 nests over motor housing 54.

Figure 3A:
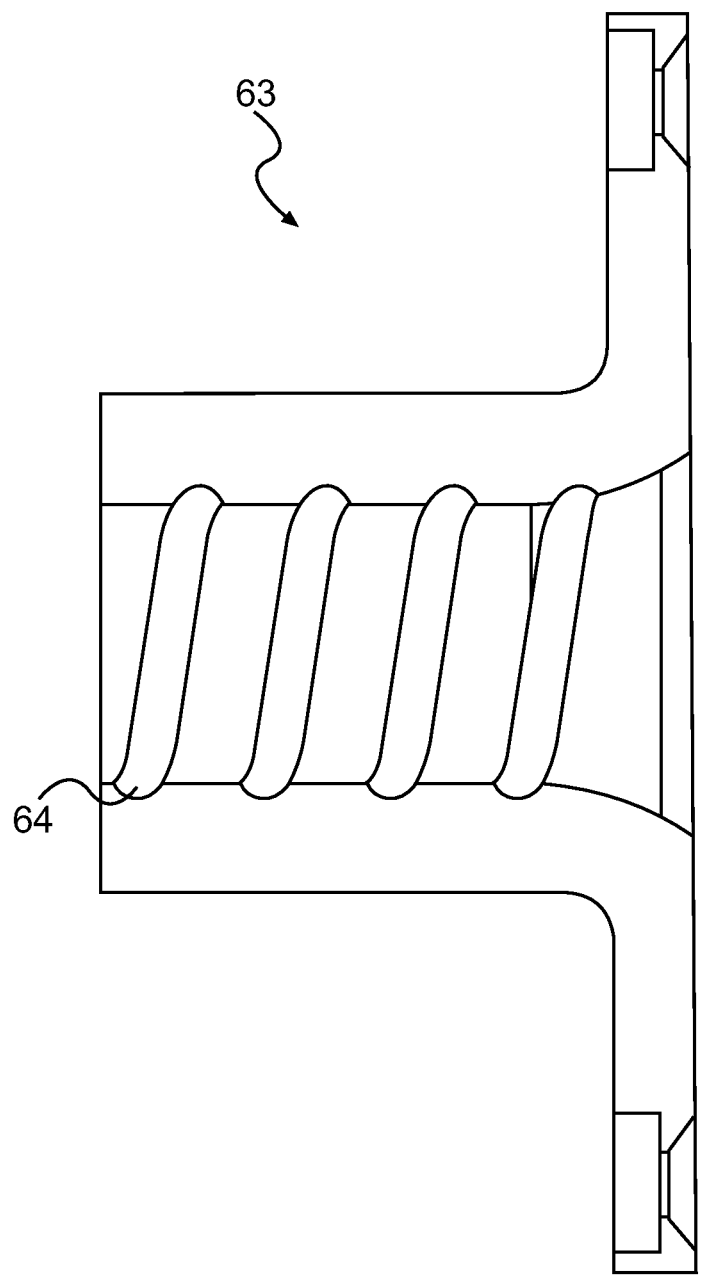
FIG. 3A is a side view of a seal member as further disclosed herein.

Splash shield 50 surrounds blade 20 on all sides and covers the top of blade 20. Shaft 22 extends through an aperture 62 in the shield's top end. A seal 63 is employed to prevent the escape of a fluid up and through lid 52. One embodiment of seal 63 is illustrated in FIG. 3A. Seal 63 is in the lid aperture 62 through which shaft 22 passes. Seal 63 reduces or prevents fluid from passing around shaft 22 upwardly through the shield's top end. Shaft 22 can move independently of shield 50 so seal 63 allows for the linear movement of shaft 22 into and out of shield 50. The inside face of seal 63 in contact or close proximity with shaft 22 includes a helical groove 64. Groove 64 permits and encourages the downward flow of fluid were any fluid to enter seal 63.

FIGS. 2 and 3 illustrate motor 14 and shield in the home position whereby a user can access cup 4 and the cup-receiving position. In this home position, mixing motor 14 cannot be activated, as further described below.

Figure 4:
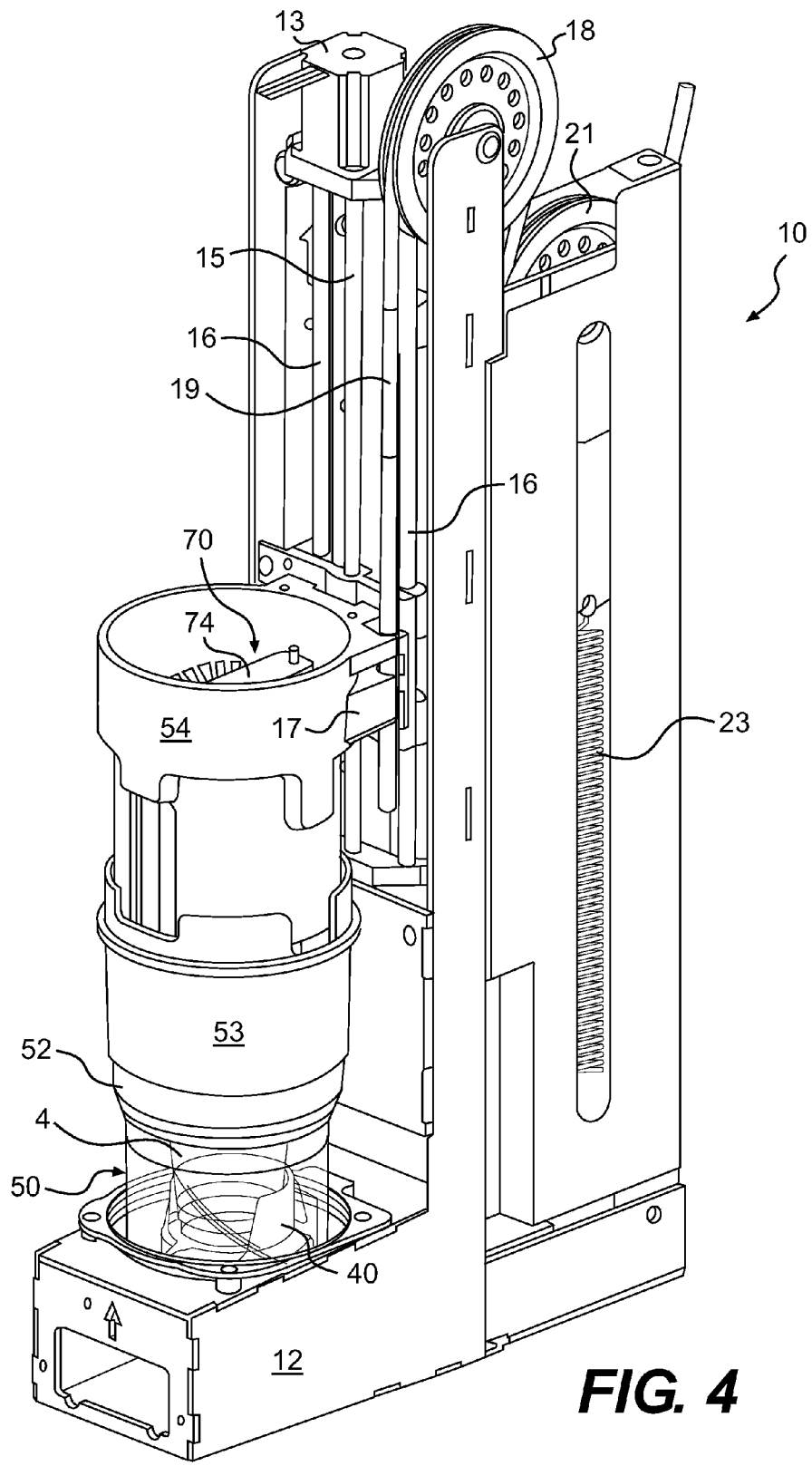
FIG. 4 is a perspective, semi-transparent view of one embodiment of the subject apparatus wherein a mixing blade and splash shield are shown in an mixing or down position so that the shield is in the well and at least partially encloses the opening of a cup.
Figure 5:
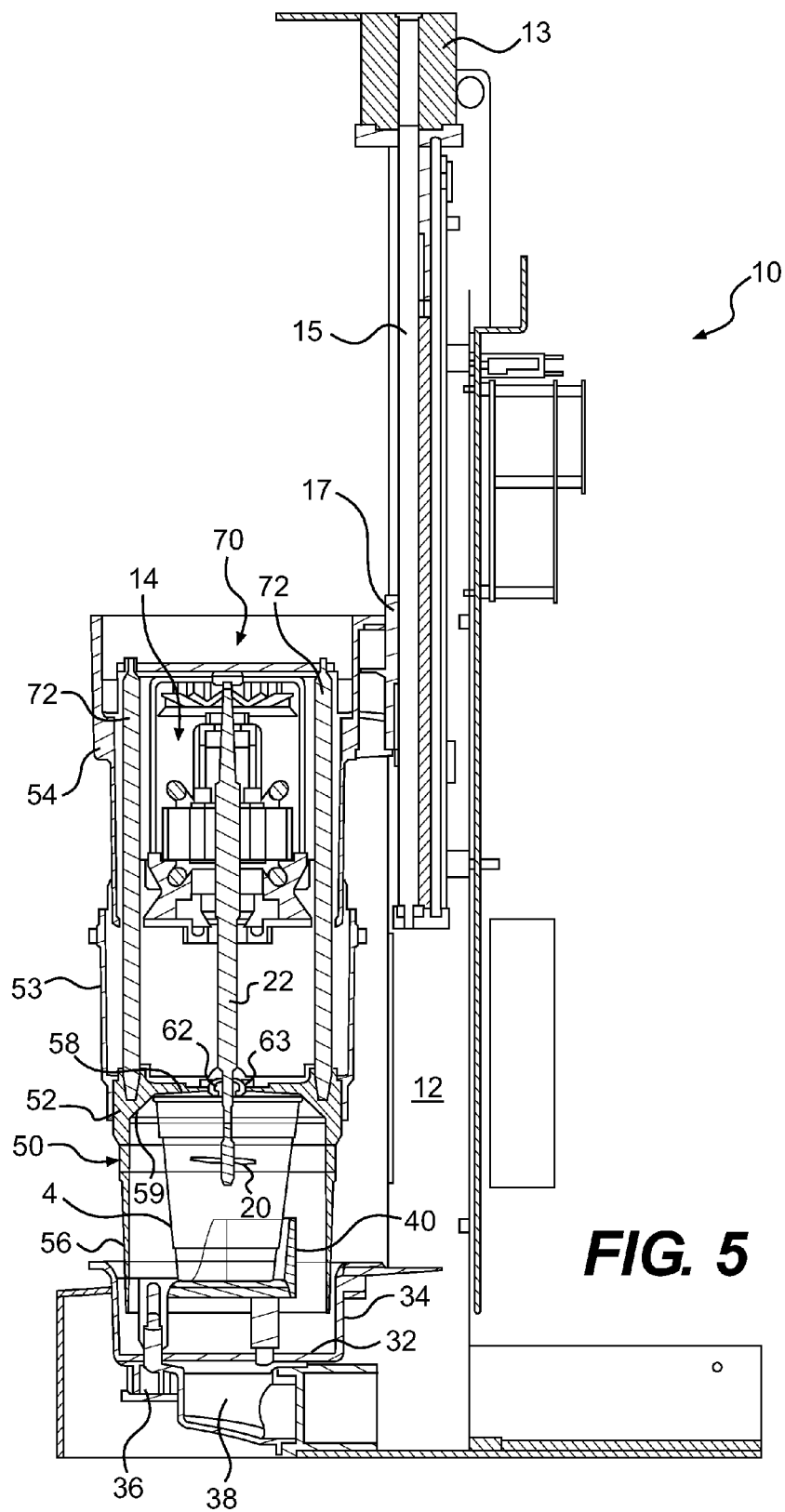
FIG. 5 is a side cut-away view of the same.

Turning then to FIGS. 4 and 5, there is illustrated the embodiment of FIGS. 1 and 2 but where carriage 17 has been moved downwards to the mixing position. In the mixing position, as briefly referenced above, shield 50 comes to rest on a cup 4. In the absence of a cup, shield 50 would rest on frame 12. In this illustrated embodiment, shield 50 does not contact frame 12 or floor 32 of well 30 due to the height of the cup. In the mixing position, cup 4 is closed by lid 52 and is at least partially surrounded by shield 50.

In one embodiment, the connection of shield sidewall 56 to closed top end 58 forms a frustoconical shape or portion 59. That is, the connection between sidewall 56 and lid 52 is sloped as if to form a cone. However, the cone tip is truncated.

Conical portion 59 creates an effective seal on cup 4 despite the use of cups that might be of different diameters. Conical portion 59 also serves to center cup 4 on the cup-receiving position or holder. Where the conical portion engages a cup disproportionally on one side, the slope of lid 52 translates the downward motion of shield 50 into a lateral motion to better position cup 4 within shield 50.

Figure 5A:
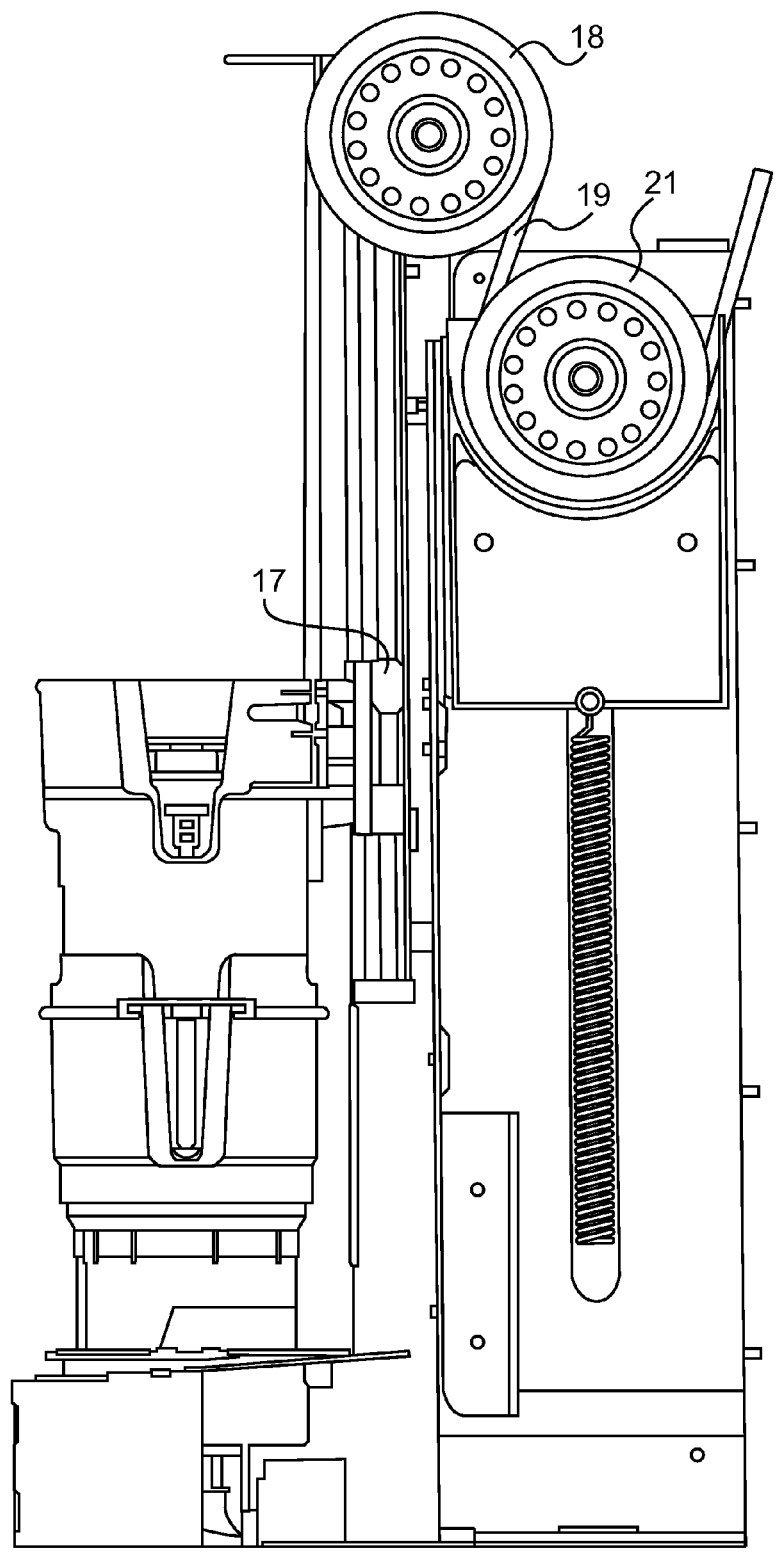
FIG. 5A further illustrates a cord management pulley system as disclosed herein.

FIG. 5A further illustrates the pulley-based cord management system. A portion of frame 12, which helps to define a vertical track, is removed to better illustrate the cord management system. Moveable pulley 21 is secured via an axle to the moveable pulley housing. The pulley housing slides within the vertical track defined by frame 12.

The downward movement of carriage 17 places tension on cord 19. This tension exceeds the spring bias provided by spring 23. As a result, pulley 21 moves up within frame 12. As carriage 17 is lifted on lead screw 15 so as to move up relative to frame 12, spring 23 biases pulley 21, via the pulley housing, downwards. In this manner, any slack in cord 19 is controlled by the pulley system.

Figure 6:
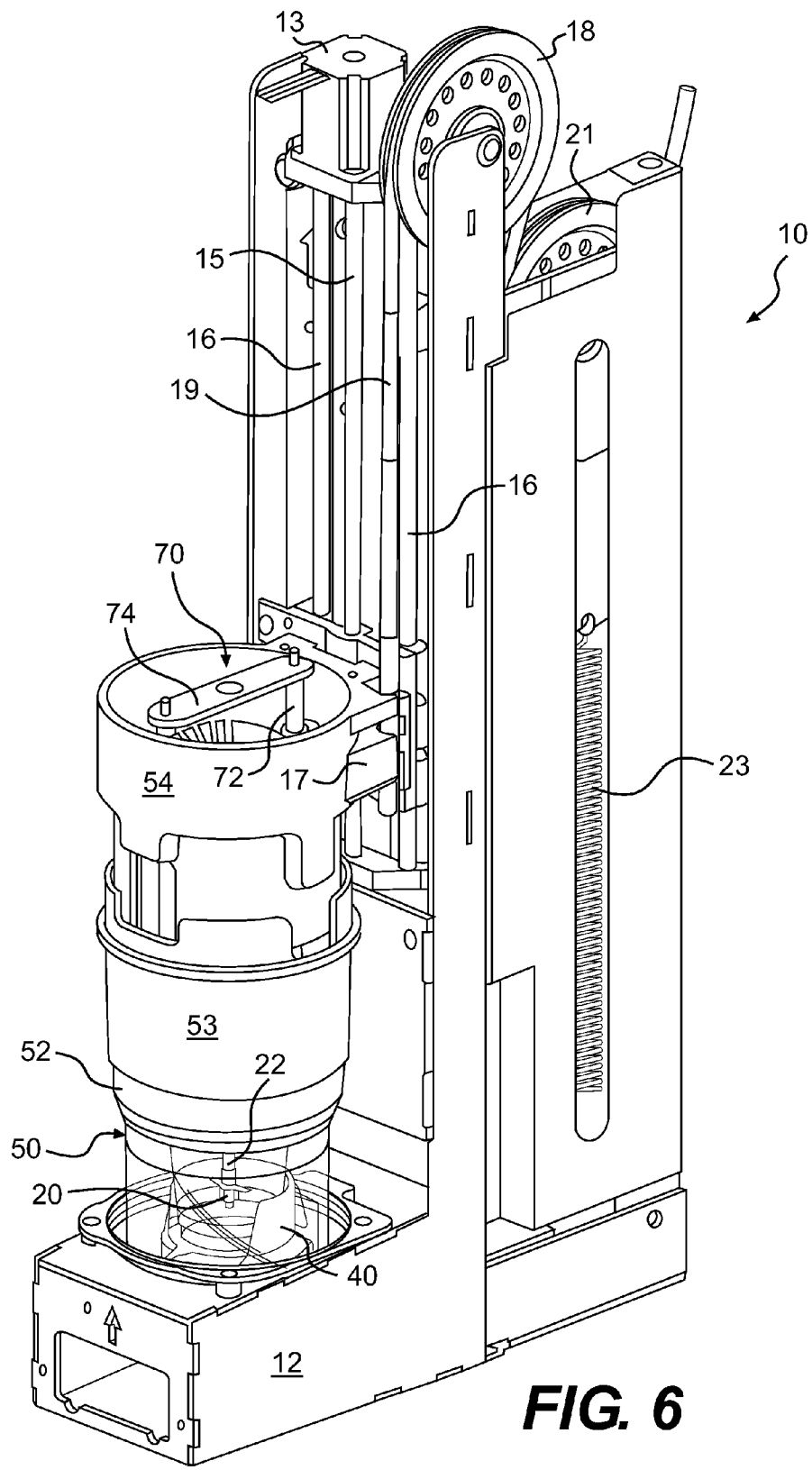
FIG. 6 is a perspective, semi-transparent view of an embodiment of the subject apparatus wherein the splash shield is in a mixing or down position and the blade is in a mixing position so as to engage the contents of a cup.
Figure 7:
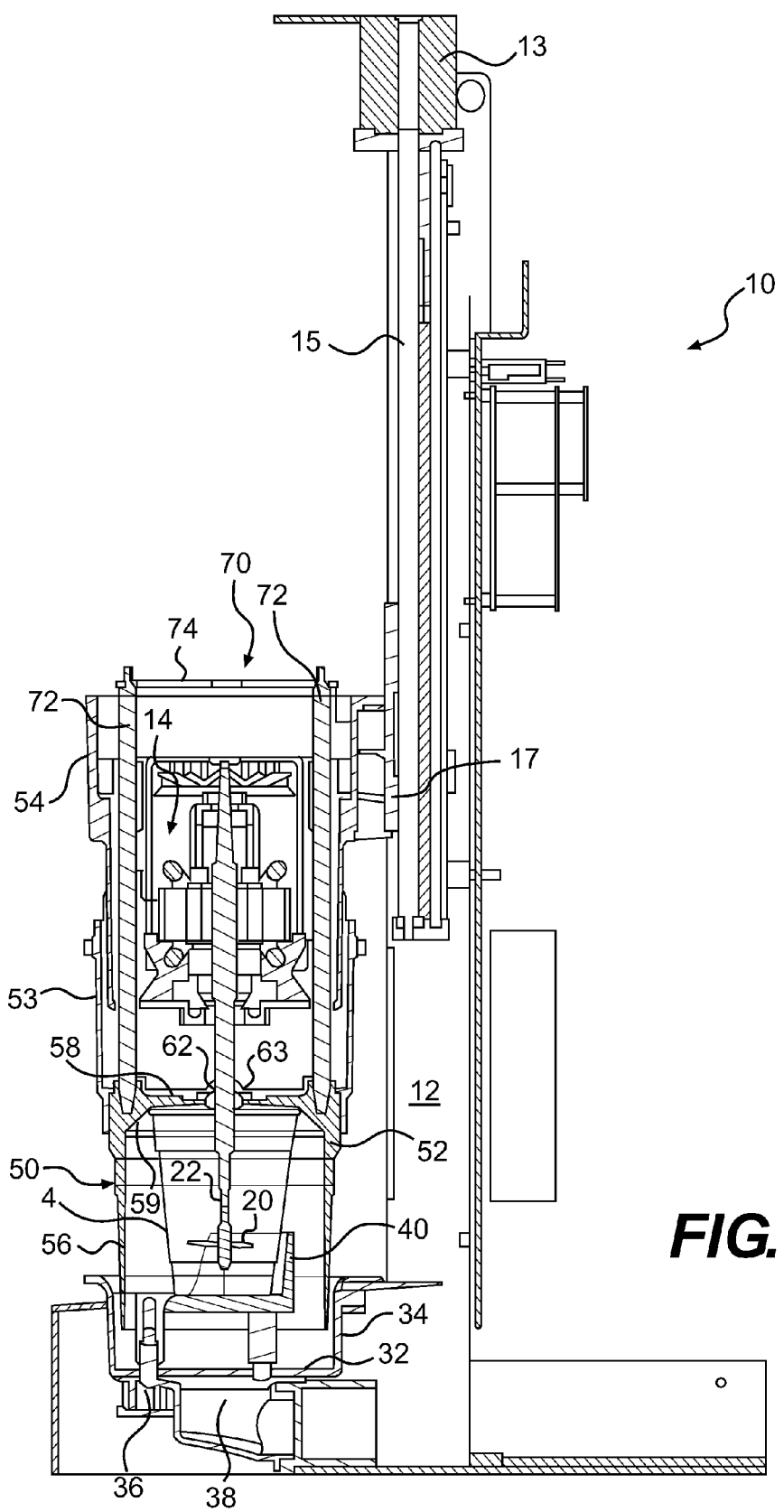
FIG. 7 is a side cut-away view of the same.

With respect to FIGS. 6 and 7, it is evident that blade 20 and motor 14 may continue to move down relative to frame 12 even after shield 50 comes into contact, and is stopped by, cup 4. Prop 70 is fixed to shield 50 by guide rods 72. Motor 14 slidably moves along guide rods 72. As carriage 17 continues to move mixing motor 14 closer to shield 50, upper stop plate 74 moves away from mixing motor 14. In this manner, mixing motor 14 can be reciprocally moved up and down without displacing shield 50 during the mix cycle. The ability to move blade 20 up and down during a mix cycle increases the quality and consistency of the blended product.

Following the mix cycle, which can comprise a pre-programmed sequence of blade movements and variable blade speed changes, stepper motor 13 is actuated to rotate lead screw 15 to lift carriage 17. The motor engages the stop plate 74. As a result, shield 50 and blade 20 are withdrawn from cup 4. Cup 4 is then removed.

Figure 8:
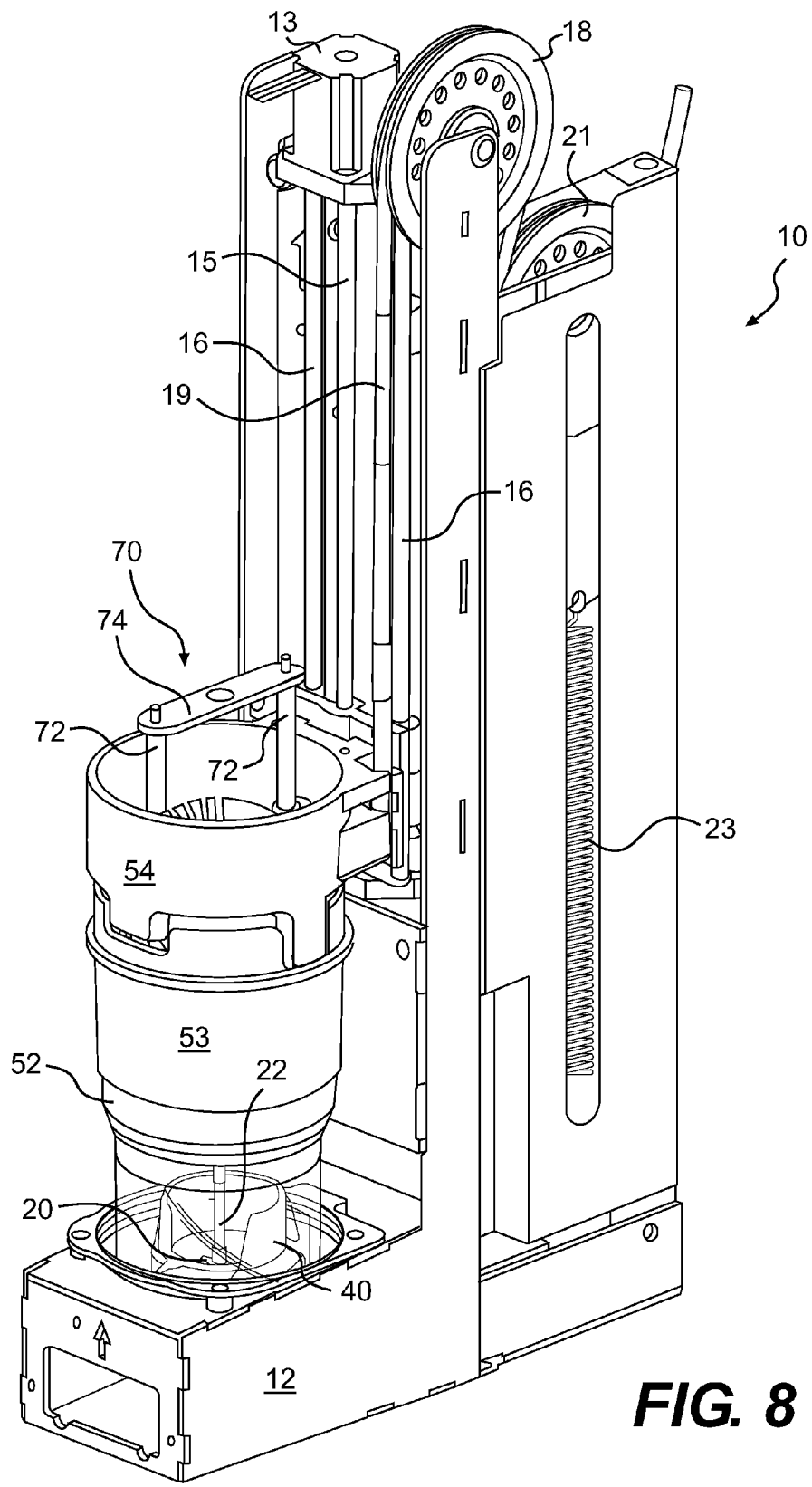
FIG. 8 is a perspective, semi-transparent view of an embodiment of the subject apparatus wherein the splash shield and blade are in a cleaning position.
Figure 9:
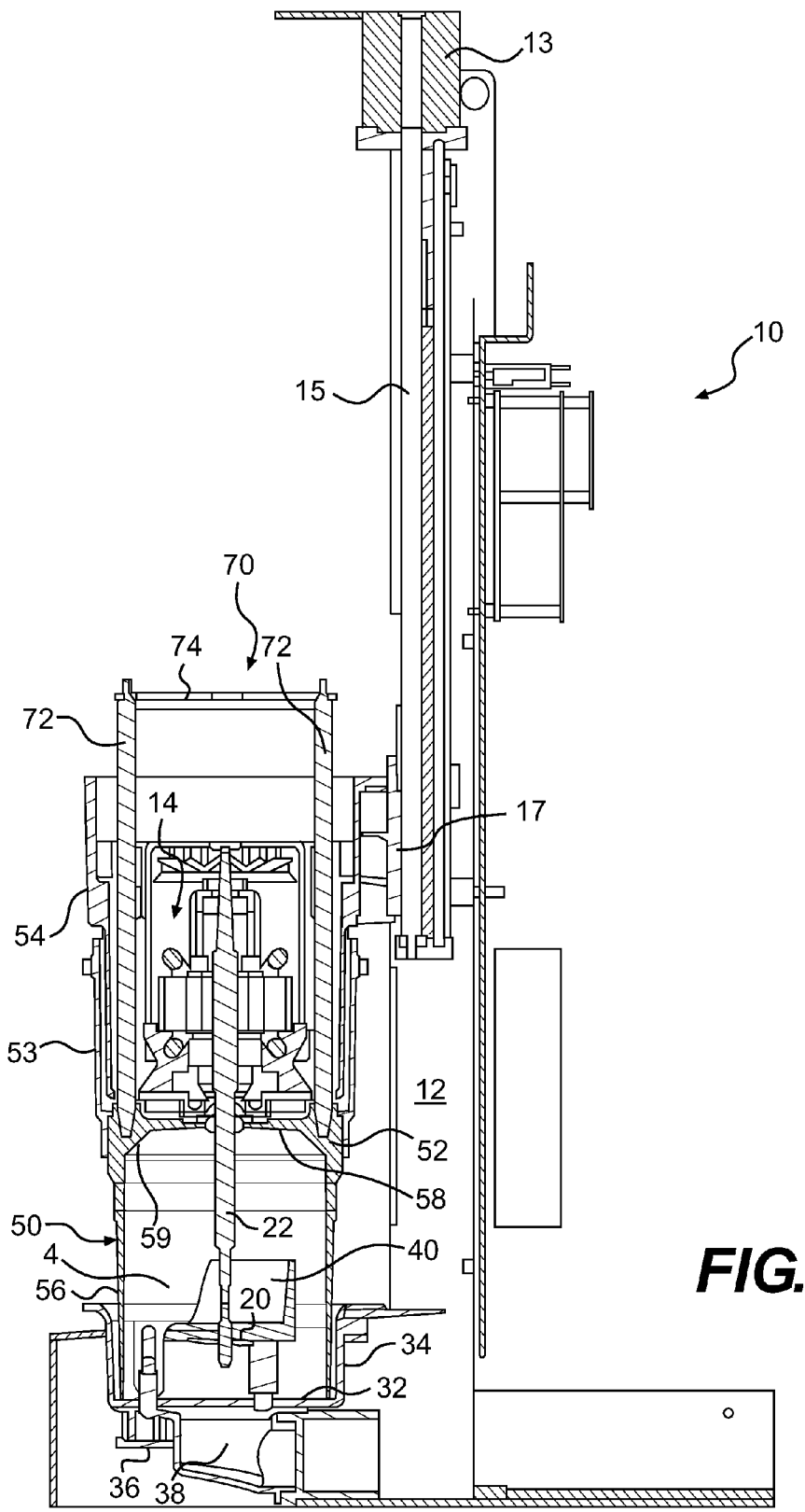
FIG. 9 is a side cut-away view of the same.

Turning now to FIGS. 8 and 9, apparatus 10 or a user then engages a cleaning cycle. Carriage 17 is positioned, via the stepper motor and lead screw, in a cleaning position. In the cleaning position, shield 50 brought into contact with frame 12 (such as well 30) to create an enclosed space about the cup-receiving position. Cup-receiving holder 40 would be encased by shield 50 and well floor 32, for example.

As further illustrated in FIGS. 8 and 9, with cup 4 removed, motor 14 can be lowered past the lowest mix position. As a result, blade 20 and/or shaft 22 extend below the cup-receiving position. For example, blade 20 can pass through the cup-receiving holder 40. During the cleaning operation or cycle, it would again be possible to reciprocally move blade 20 up and down without displacing shield 50.

In the cleaning operation, and with reference to FIGS. 10 and 11, fluid enters a manifold 36 via pipe 35. The fluid is transmitted to the space enclosed by shield 50 via manifold 36 and fluid nozzles 37. The fluid will strike blade 20, which can be rotated during the cleaning cycle to further disperse the fluid. The cleaning operation rinses the interior of shield 50 (including shield lid 52), cup-receiving holder 40, blade 20, and shaft 22. Cleaning fluid exits the frame via the drain 38, which is tied to an outlet pipe. The cleaning operation is automatic and requires little to no user involvement. As such, the automated mix in-cup apparatus is self-cleaning, which permits a user to fill another cup during the cleaning operation.

Figure 12:
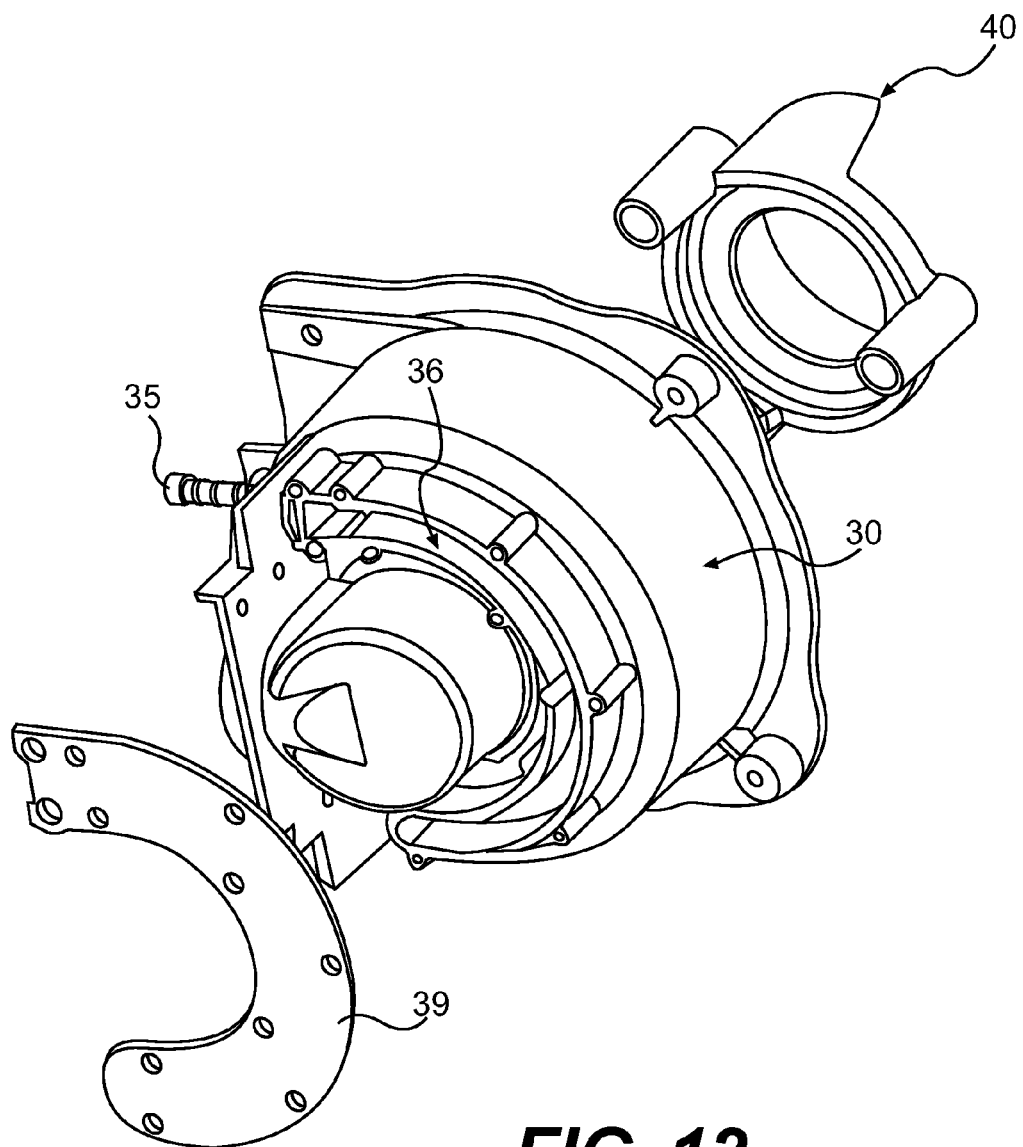
FIG. 12 is an exploded view of the selectively removable cup-receiving holder, a liquid well, and a manifold cover as found in one embodiment disclosed herein.
Figure 13:
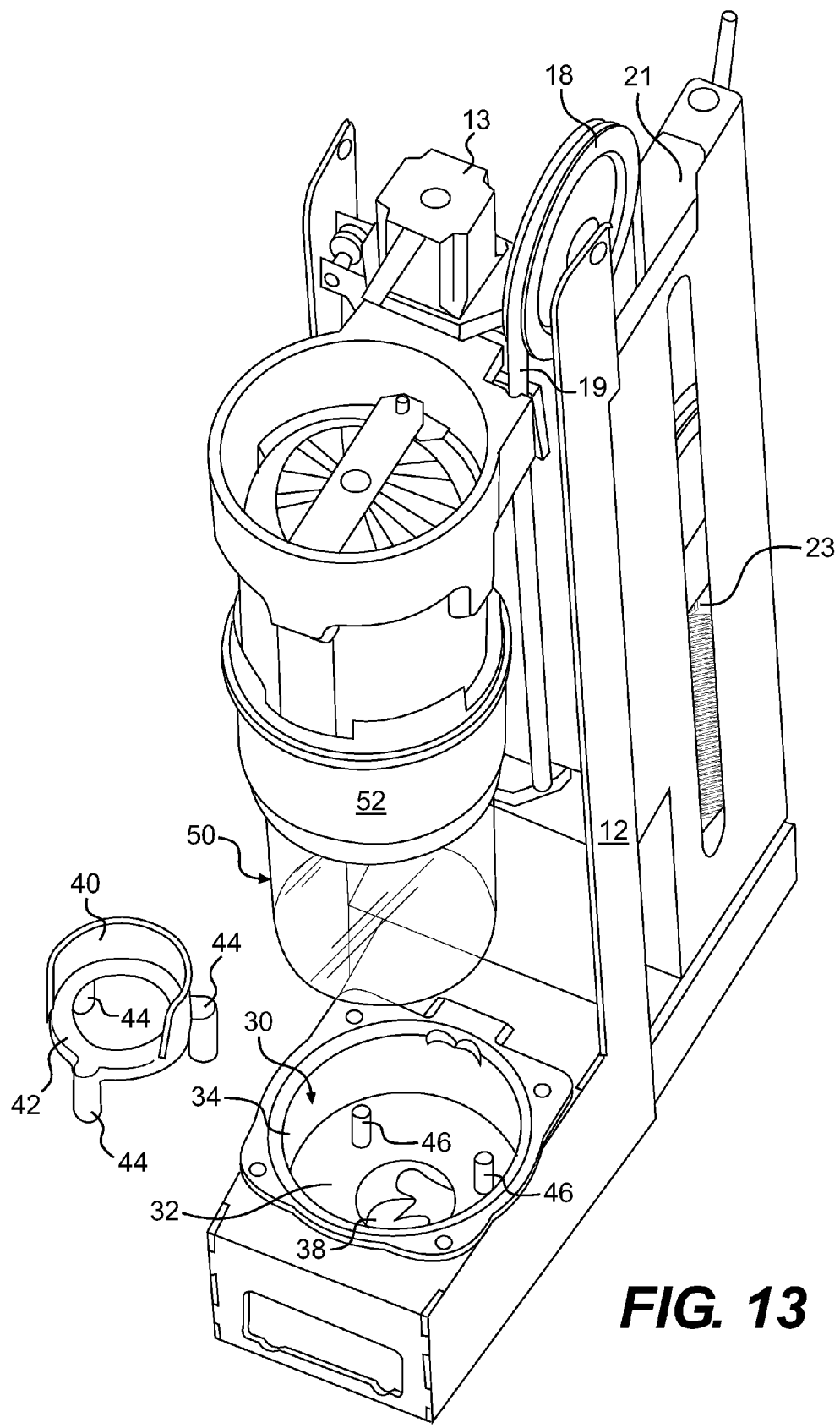
FIG. 13 is a perspective view of the subject apparatus further illustrating a selectively removable cup-receiving holder as found in one embodiment disclosed herein

FIG. 12 illustrates the underside of well 30 with manifold 36 in an exploded view. A bottom plate 39 of manifold 36 is removed to reveal one embodiment of the interior of manifold 36. Holder 40 is illustrated as being removed from well 30.

Turning to FIG. 12, cup-receiving holder 40 includes an open ring 42 upon which cup 4 rests. Ring 42 provides an aperture through which blade 20 passes when carriage 17 is in the cleaning position.

As briefly noted above, holder 40 may be selectively removable from frame 12. Holder 40 could include one or more hollow posts 44 that engage vertical posts 46 on frame 12. For instance, vertical posts 46 might be integral to well floor 32. Vertical posts 46 nest within hollow posts 44 of the holder in order to frictionally retain holder 40 in place. A user could lift holder 40 off frame 12 to independently clean holder 40, if necessary. Removing holder 40 provides the means to further clean the holder and/or the drain and frame that are located beneath holder 40.

Overall, apparatus 10 is easy to operate, safe, and fast in that shield 50 and mixing blade 20 automatically move into and out of the mix position. A user is provided one-handed operation in that they merely need to place the cup before the mix cycle and remove the cup after the mix cycle. There is no need to manually manipulate the cup, the shield, or any other components of the apparatus besides cup 4. Nevertheless, a user may mistakenly attempt to access or manipulate the splash shield or to otherwise access the cup during a mix cycle.

Figure 14:
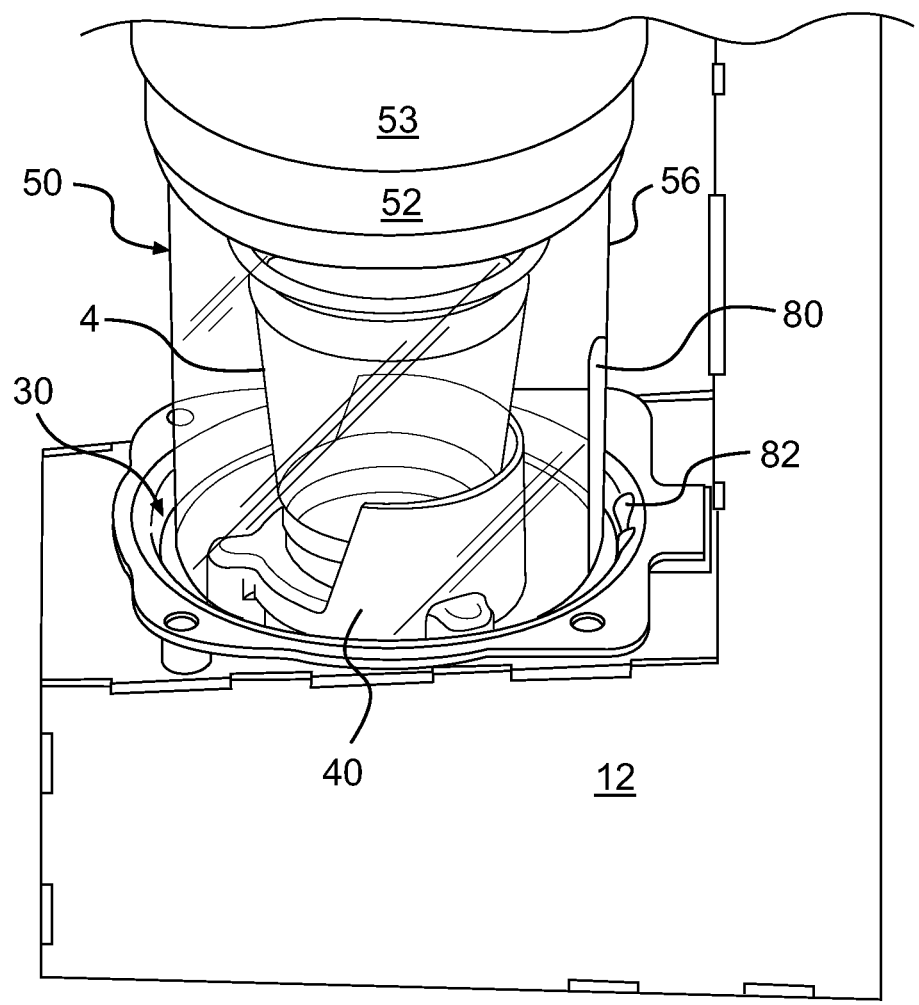
FIG. 14 is a close-up, semi-transparent view of the splash shield in the well and a related interlock safety mechanism.

Turning now to FIG. 14, there is illustrated a close-up view of shield 50 in the mixing position. In the illustrated embodiment, a magnetic strip 80 is integrated into or otherwise secured to sidewall 56 of shield 50. Corresponding shield sensors 82 on frame 12 (e.g., in well 30) are operable to detect magnetic strip 80. In the mix and cleaning positions, mixing motor 14 will not rotate blade 20 unless shield sensors 82 detect magnetic strip 80. A control unit will disengage mixing motor 14 once strip 80 is displaced. As such, a user cannot lift shield 50 to access cup 4 without disengaging mixer motor 14.

Figure 15:
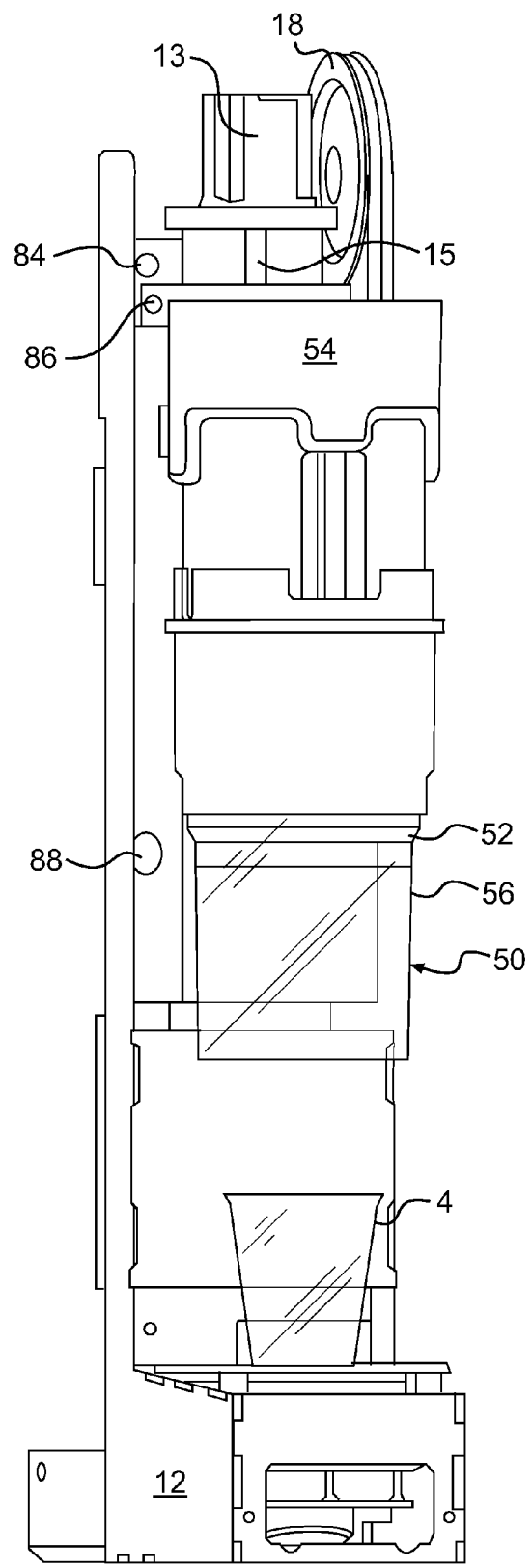
FIG. 15 is a three quarter front view of one embodiment of the subject apparatus illustrating sensors located on the apparatus.

Additional sensors provide feedback to the control unit, as further illustrated in FIG. 15. A home sensor 84 is used to determine if carriage 17 is properly returned to the home position after each mix and cleaning cycle. Home sensor 84 is operable to detect a magnet 86 located on carriage 17. Stepper motor 13 runs until home sensor 84 detects magnet 86 or until there is a time-out condition. For example, if carriage 17 is obstructed, stepper motor 13 will run for a predetermined period of time that is longer than it takes for carriage 17 to return to the home position. If the magnet 86 is not detected within that time period, stepper motor 13 is deactivated and apparatus 10 would be reset.

Once home sensor 84 detects magnet 86, stepper motor 13 reverses lead screw 15 until magnet 86 is no longer detected. Carriage 17 is then raised a second time until magnet 86 is detected by home sensor 84. This provides an optional calibration mechanism so that the position of carriage 17 is calibrated prior to a mix or cleaning cycle.

A cup sensor 88 also works in conjunction with magnet 86 and the control unit. The failure to detect magnet 86 at cup sensor 88 indicates to the control unit that shield 50 is not in the cleaning position. As referenced above, in the cleaning position, shield 50 contacts frame 12 (e.g., well floor 32). Shield 50 creates an enclosed interior space to capture the cleaning fluid during the cleaning cycle. With the cup in place, shield 50 does not reach the frame or well floor. As a result, shield 50 will not properly rest against frame 12 or well floor 32. The shield will not create an enclosed interior space so that the cleaning fluid will not be fully contained during the cleaning cycle. Cup sensor 88 prevents the initiation of the cleaning cycle where a user leaves the cup in place.

In addition, carriage 17 moves blade 20 to a cleaning position that is below the blade's "mixing position" and below the cup-receiving portion of holder 40. If a user forgets to remove cup 4, blade 20 will move downwardly until it contacts the floor of the cup. The floor will resist the further movement of blade 20 on shaft 22. The extra load on the stepper motor causes it to stall. As a result, carriage 17 will not be in the proper position for cup sensor 88 to detect magnet 86 on carriage 17.

The method of using the subject apparatus provides for one-handed operation that is fast, safe, clean, easy to use, and effective. In use, a user places a cup with consumable material at the cup-receiving position, such as on the cup-receiving holder, and activates the apparatus via a switch, button, touch-pad, or the like. The apparatus automatically lowers the carriage to the mixing position. In the mixing position, the shield lid closes the top of the cup, and the mixing blade is positioned within the cup and consumable material.

The mixing motor is automatically activated to rotate the mixing blade thereby causing the consumable material to be mixed. The speed of the blade may be variable, and the blade may move up and down within the cup during the mix cycle without displacing the splash shield.

After the mix cycle is completed, the carriage is returned to the home position whereby the splash shield and mixing blade are lifted from the cup. The user can access and remove the cup from the cup-receiving position.

A cleaning cycle is then manually or automatically activated. The splash shield, which still surrounds the blade, is again lowered into contact with the frame. The splash shield and frame (such as well floor 32) create an enclosed entire space. The cup-receiving position and/or cup-receiving holder are encased by the splash shield and frame. The blade can be positioned at various distances from the frame including beneath the level of the cup-receiving holder. Mixing blade could be moved during the cleaning cycle without displacing the splash shield.

The cleaning cycle is initiated, and fluid is injected into the interior of the shield via an inlet manifold. The fluid contacts and cleans the shield (including the lid), blade, cup-receiving position, and optional cup-receiving holder. The mixing motor can be engaged to rotate the mixing blade during the cleaning cycle to increase fluid distribution or force. The rinse fluid is removed via the drain. In this manner, the automated mixing of the material and subsequent cleaning of the apparatus can be achieved. A user may select the flavors to be dispensed for the next order while the mix in-cup apparatus mixes a previous order and executes a self-clean operation. The mixing blade is isolated from the user during the mixing and cleaning operations. An attempt to displace the splash shield during the mixing or cleaning cycles deactivates the mixing motor.

While the disclosure has been described with reference to specific embodiments thereof, it will be understood that numerous variations, modifications and additional embodiments are possible, and all such variations, modifications, and embodiments are to be regarded as being within the spirit and scope of the disclosure.

What is claimed is:

1. An automated mix in-cup apparatus for mixing consumable material,
  the apparatus comprising:
  a frame supporting a reciprocating carriage, the carriage supporting a mixing motor and a splash shield above a cup-receiving position, the splash shield comprising at least one sidewall and a closed lid and an open bottom end, the frame further comprising a well beneath the cup-receiving position, the well comprising a floor, a sidewall, an inlet manifold comprising at least one nozzle, and a drain;
  a cup-receiving holder positioned at the cup-receiving position, the cup-receiving holder selectively removable from the frame;
  a rotatable mixing blade extending from the mixing motor for mixing a consumable material, the motor operable to rotate the mixing blade; and
  the shield further comprising a magnetic portion and the apparatus further comprising a first sensor operable to detect the magnetic portion of the shield and a safety interlock to prevent the actuation of the mixing blade when the magnetic portion is not proximate to the sensor.

2. The apparatus of claim 1, wherein the movement of the splash shield is selectively independent of the movement of the mixing blade.

3. The apparatus of claim 1, wherein a connection of the splash shield sidewall to the closed lid forms a conical portion, the conical portion effective to selectively seal the cup.

4. The apparatus of claim 1 further wherein a movement of the mixing blade is automatically effected to enter and exit a cup selectively placed at the cup-receiving position and the movement of the splash shield automatically effected to contact the frame, the contact between the splash shield and frame defining an enclosed space, the enclosed space comprising the cup-receiving position.

5. The apparatus of claim 1, wherein the carriage is positioned between three operational positions, the operational positions comprising a home position, a mixing position and a cleaning position.

6. The apparatus of claim 5, the apparatus further comprising a motor to drive the rotation of a lead screw, the lead screw passing through the carriage, the lead screw translating the rotational movement into a linear movement of the carriage.

7. The apparatus of claim 1, the apparatus further comprising a cord management system, the cord management system comprising at least one reciprocating pulley, the movement of the reciprocating pulley being directionally opposite of the movement of the reciprocating carriage.

8. The apparatus of claim 1, wherein the carriage comprises a carriage magnetic portion, the apparatus comprising a second sensor operable to detect the magnetic portion of the carriage, the apparatus operable to determine the location of the carriage via the detection of the carriage magnetic portion by the second sensor.

* * * * *